US012569946B2

(12) United States Patent
Smith

(10) Patent No.: US 12,569,946 B2
(45) Date of Patent: Mar. 10, 2026

(54) ADJUSTABLE PART-MANUFACTURING TOOL AND ASSOCIATED SYSTEMS AND METHODS

(71) Applicant: The Boeing Company, Arlington, VA (US)

(72) Inventor: John Smith, Cypress, CA (US)

(73) Assignee: The Boeing Company, Arlington, VA (US)

( * ) Notice: Subject to any disclaimer, the term of this patent is extended or adjusted under 35 U.S.C. 154(b) by 27 days.

(21) Appl. No.: 18/483,399

(22) Filed: Oct. 9, 2023

(65) Prior Publication Data

US 2025/0114882 A1     Apr. 10, 2025

(51) Int. Cl.
  *B23K 37/04*      (2006.01)
  *B23Q 1/62*       (2006.01)
  *B23Q 3/18*       (2006.01)

(52) U.S. Cl.
  CPC .......... *B23K 37/0452* (2013.01); *B23Q 1/621* (2013.01); *B23Q 3/18* (2013.01)

(58) Field of Classification Search
  CPC ...... B23K 37/0452; B23Q 1/621; B23Q 3/18; B23Q 1/26; B23Q 3/062; B23Q 3/064; B23Q 16/023
  See application file for complete search history.

(56) References Cited

U.S. PATENT DOCUMENTS

| | | | | |
|---|---|---|---|---|
| 2,882,656 | A | * | 4/1959 | Novkov ................. B25B 1/103<br>451/365 |
| 3,704,503 | A | * | 12/1972 | Haywood .......... B23K 37/0533<br>29/256 |
| 3,901,497 | A | * | 8/1975 | Dearman ................ B25B 5/147<br>269/130 |
| 3,925,854 | A | * | 12/1975 | McFadden ......... B23K 37/0533<br>219/161 |
| 4,378,937 | A | * | 4/1983 | Dearman ........... B23K 37/0533<br>269/228 |
| 4,524,959 | A | * | 6/1985 | Kubo ................. B23K 37/0533<br>269/239 |
| 4,726,575 | A | * | 2/1988 | Dearman ........... B23K 37/0533<br>269/131 |
| 9,707,666 | B2 | * | 7/2017 | Saraie .................... B23Q 3/066 |
| 2016/0167201 | A1 | * | 6/2016 | Saraie .................. B25B 1/2405<br>29/559 |

* cited by examiner

*Primary Examiner* — Ryan J. Walters
(74) *Attorney, Agent, or Firm* — Kunzler Bean & Adamson

(57)     ABSTRACT

An adjustable part-manufacturing tool and associated systems and methods are disclosed. The adjustable part-manufacturing tool includes a part-receiving receptacle defined by at least a first side and a second side. A first locating detail, including a first locating surface, is movably coupled to the tool body along the first side so that the first locating surface is selectively movable within the part-receiving receptacle in first opposing directions. A second locating detail, including a second locating surface, is movably coupled to the tool body along the second side so that the second locating surface is selectively movable within the part-receiving receptacle in second opposing directions. The second opposing directions are angled relative to the first opposing directions. Selective movement of the first locating surface and the second locating surface accommodates locating parts of different sizes on the first locating surface and the second locating surface within a specified tolerance.

20 Claims, 9 Drawing Sheets

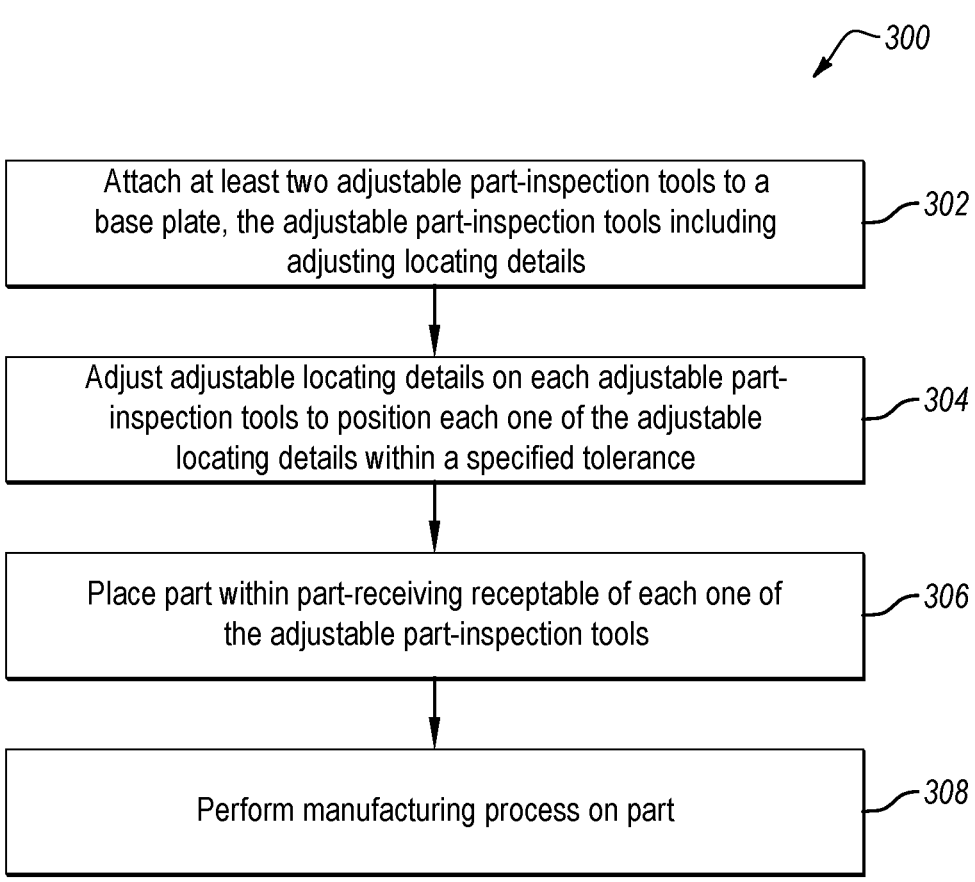

*300*

Attach at least two adjustable part-inspection tools to a base plate, the adjustable part-inspection tools including adjusting locating details   *302*

Adjust adjustable locating details on each adjustable part-inspection tools to position each one of the adjustable locating details within a specified tolerance   *304*

Place part within part-receiving receptable of each one of the adjustable part-inspection tools   *306*

Perform manufacturing process on part   *308*

FIG. 9

ADJUSTABLE PART-MANUFACTURING TOOL AND ASSOCIATED SYSTEMS AND METHODS

FIELD

This disclosure relates generally to an adjustable part-manufacturing tool, and more particularly to an adjustable part-manufacturing tool having movable locating details.

BACKGROUND

The manufacturing of tube or duct assemblies often requires the use of a manufacturing fixture, such as a weld or check fixture, to ensure the precision required by the manufacturing process. Conventional manufacturing fixtures incorporate fixed locating details, typically referred to as saddles, which must conform to specified tolerance levels dictated by engineering or tooling requirements. These tolerance levels can be very stringent, for example, as tight as 0.005 to 0.015 inches. Due to variability in the fabrication and assembly of the manufacturing fixtures, the locating details frequently fall outside the acceptable tolerance limits. If the locating details fail to meet the required location accuracy standards, the manufacturing tool must undergo rework, often extensive, until all locating details align within the designated allowable tolerances. Rework on the manufacturing fixture not only fails to add value to the manufacturing process, but also incurs significant expense. Moreover, conventional manufacturing fixtures are custom made to inspect a particular part. Accordingly, conventional manufacturing fixtures cannot be used to inspect parts with different designs.

SUMMARY

The subject matter of the present application has been developed in response to the present state of the art, and in particular, in response to the problems of and needs created by, or not yet fully solved by, manufacturing fixtures. Generally, the subject matter of the present application has been developed to provide a manufacturing fixture or a part-manufacturing tool that overcomes at least some of the above-discussed shortcomings of prior art techniques.

Disclosed herein is an adjustable part-manufacturing tool. The adjustable part-manufacturing tool includes a tool body including a part-receiving receptacle defined by a first side and a second side. The first side is angled relative to the second side. The adjustable part-manufacturing tool also includes a first locating detail, including a first locating surface. The first locating detail is movably coupled to the tool body along the first side so that the first locating surface is selectively movable within the part-receiving receptacle in first opposing directions. The adjustable part-manufacturing tool further includes a second locating detail including a second locating surface. The second locating detail is movably coupled to the tool body along the second side so that the second locating surface is selectively movable within the part-receiving receptacle in second opposing directions, that are angled relative to the first opposing directions. Selective movement of the first locating surface and the second locating surface accommodates locating parts of different sizes on the first locating surface and the second locating surface within a specified tolerance. The preceding subject matter of this paragraph characterizes example 1 of the present disclosure.

The first side is angled relative to the second side at a 90-degree angle. The preceding subject matter of this paragraph characterizes example 2 of the present disclosure, wherein example 2 also includes the subject matter according to example 1, above.

The second opposing directions are perpendicular to the first opposing directions. The preceding subject matter of this paragraph characterizes example 3 of the present disclosure, wherein example 3 also includes the subject matter according to any of examples 1-2, above.

The first locating detail and the second locating detail are made of a material that is more rigid than the material of the tool body. The preceding subject matter of this paragraph characterizes example 4 of the present disclosure, wherein example 4 also includes the subject matter according to any of examples 1-3, above.

The first locating detail and the second locating detail are adjustable in increments of at least 0.001 inches. The preceding subject matter of this paragraph characterizes example 5 of the present disclosure, wherein example 5 also includes the subject matter according to any of examples 1-4, above.

The part-receiving receptacle is defined by a third side. The third side is spaced apart from and parallel to the first side. The second side extends between the first side and the third side. A third locating detail includes a third locating surface and is movably coupled to the tool body along the third side so that the third locating surface is selectively movable within the part-receiving receptacle in third opposing directions that are parallel to the first opposing directions. The preceding subject matter of this paragraph characterizes example 6 of the present disclosure, wherein example 6 also includes the subject matter according to any of examples 1-5, above.

The adjustable part-manufacturing tool includes an attachment bracket. The attachment bracket includes a body-attachment portion and a base-attachment portion. The body-attachment portion is attached to the tool body. The base-attachment portion is configured to be removably attachable to a base plate. The preceding subject matter of this paragraph characterizes example 7 of the present disclosure, wherein example 7 also includes the subject matter according to any of examples 1-6, above.

The body-attachment portion is angled relative to the base-attachment portion. The preceding subject matter of this paragraph characterizes example 8 of the present disclosure, wherein example 8 also includes the subject matter according to example 7, above.

The tool body includes a first channel, extending into the tool body from the first side, and a second channel, extending into the tool body from the second side. The first locating detail slides within the first channel when the first locating surface moves within the part-receiving receptacle in the first opposing directions. The second locating detail slides within the second channel when the second locating surface moves within the part-receiving receptacle in the second opposing directions. The preceding subject matter of this paragraph characterizes example 9 of the present disclosure, wherein example 9 also includes the subject matter according to any of examples 1-8, above.

The tool body includes a first threaded hole. The adjustable part-manufacturing tool includes a first set screw threadably engaged with the first threaded hole. The adjustable part-manufacturing tool also includes a first cam within the first channel of the tool body and pivotably coupled to the first set screw so that rotation of the first set screw within the first threaded hole pivots the first cam within the first channel. The first cam is coupled to the first locating detail so that when the first cam pivots, the first locating detail moves in one of the first opposing directions within the first channel. The tool body also includes a second threaded hole. The adjustable part-manufacturing tool includes a second set screw threadably engaged with the second threaded hole. The adjustable part-manufacturing tool also includes a second cam within the second channel of the tool body and pivotably coupled to the second set screw so that rotation of the second set screw within the second threaded hole pivots the second cam within the second channel. The second cam is coupled to the second locating detail so that when the second cam pivots, the second locating detail moves in one of the second opposing directions within the second channel. The preceding subject matter of this paragraph characterizes example 10 of the present disclosure, wherein example 10 also includes the subject matter according to example 9, above.

The adjustable part-manufacturing tool includes at least one first biasing element within the first channel configured to keep the first locating detail under compression. The adjustable part-manufacturing tool also includes at least one second biasing element within the second channel configured to keep the second locating detail under compression. The preceding subject matter of this paragraph characterizes example 11 of the present disclosure, wherein example 11 also includes the subject matter according to any of examples 9-10, above.

Also disclosed herein is a system for inspecting a part. The system includes a base plate. The system also includes a plurality of adjustable part-manufacturing tools configured to be removably attachable to the base plate. Each one of the plurality of adjustable part-manufacturing tools includes a tool body including a part-receiving receptacle defined by a first side and a second side. The first side is angled relative to the second side. Each one of the plurality of adjustable part-manufacturing tools also includes a first locating detail comprising a first locating surface. The first locating detail is movably coupled to the tool body along the first side so that the first locating surface is selectively movable within the part-receiving receptacle in first opposing directions. Each one of the plurality of adjustable part-manufacturing tools further includes a second locating detail including a second locating surface. The second locating detail is movably coupled to the tool body along the second side so that the second locating surface is selectively movable within the part-receiving receptacle in second opposing directions, that are angled relative to the first opposing directions. Additionally, each one of the plurality of adjustable part-manufacturing tools includes an attachment bracket including a body-attachment portion, attached to the tool body, and a base-attachment portion, configured to be removably attachable to the base plate. Selective movement of the first locating surface and the second locating surface accommodates locating parts of different sizes on the first locating surface and the second locating surface within a specified tolerance. The preceding subject matter of this paragraph characterizes example 12 of the present disclosure.

The body-attachment portion of the attachment bracket of at least one of the plurality of adjustable part-manufacturing tools is angled relative to the base-attachment portion at a 90-degree angle. The at least one of the plurality of adjustable part-manufacturing tools is configured to be attachable to the base plate such that the movement of the second locating surface in second opposing directions is perpendicular to the base plate. The preceding subject matter of this paragraph characterizes example 13 of the present disclosure, wherein example 13 also includes the subject matter according to example 12, above.

The body-attachment portion of the attachment bracket of at least one of the plurality of adjustable part-manufacturing tools is angled relative to the base-attachment portion at a non-right angle. The at least one of the plurality of adjustable part-manufacturing tools is configured to be attachable to the base plate such that the movement of the second locating surface in second opposing directions is non-perpendicular to the base plate. The preceding subject matter of this paragraph characterizes example 14 of the present disclosure, wherein example 14 also includes the subject matter according to example 12, above.

The base plate includes a plurality of fittings. The base-attachment portion of the attachment device is removably attachable to any one of the plurality of fittings. The preceding subject matter of this paragraph characterizes example 15 of the present disclosure, wherein example 15 also includes the subject matter according to any of examples 12-14, above.

Further disclosed herein is a method for a manufacturing process of a part. The method includes removably attaching at least two adjustable part-manufacturing tools to a base plate. Each one of the adjustable part-manufacturing tools includes a plurality of locating details. The method also includes adjusting the plurality of locating details on each one of the adjustable part-manufacturing tools to position each one of the plurality of locating details within a specified tolerance. The method further includes placing the part within a part-receiving receptacle of each one of the adjustable part-manufacturing tools. The method additionally includes performing the manufacturing process on the part. The preceding subject matter of this paragraph characterizes example 16 of the present disclosure.

The method also includes, after performing the manufacturing process on the part, detaching the at least two adjustable part-manufacturing tools from the base plate. The preceding subject matter of this paragraph characterizes example 17 of the present disclosure, wherein example 17 also includes the subject matter according to example 16, above.

The part is a duct. The preceding subject matter of this paragraph characterizes example 18 of the present disclosure, wherein example 18 also includes the subject matter according to any of examples 16-17, above.

The part defines at least one straight segment including a first end and a second end. The step of removably attaching at least two adjustable part-manufacturing tools includes removably attaching one of the at least two adjustable part-manufacturing tools to the base plate to correspond with the first end of the at least one straight segment and removably attaching another one of the at least two adjustable part-manufacturing tools to the base plate to correspond with the second end of the at least one straight segment. The preceding subject matter of this paragraph characterizes example 19 of the present disclosure, wherein example 19 also includes the subject matter according to any of examples 16-18, above.

The step of adjusting the plurality of locating details includes adjusting a first locating detail including a first locating surface so that the first locating surface is adjustable within the part-receiving receptacle in first opposing directions. The step of adjusting the plurality of locating details also includes adjusting a second locating detail including a second locating surface so that the second locating surface is adjustable within the part-receiving receptacle in second opposing directions. The preceding subject matter of this paragraph characterizes example 20 of the present disclosure, wherein example 20 also includes the subject matter according to any of examples 16-19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which:

FIG. 9 is a schematic flow diagram of a method for performing a manufacturing process on a part, according to one or more examples of the present disclosure.

DETAILED DESCRIPTION

Reference throughout this specification to "one example," "an example," or similar language means that a particular feature, structure, or characteristic described in connection with the example is included in at least one example of the subject matter of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the subject matter of the present disclosure, however, absent an express correlation to indicate otherwise, an implementation may be associated with one or more examples.

Disclosed herein are examples of an adjustable part-manufacturing tool and associated systems and methods of use. The following provides some features of at least some examples of the adjustable part-manufacturing tool. A plurality of adjustable part-manufacturing tools, together with a base plate, are used to accommodate (e.g., support) a part during a manufacturing process. The resulting manufacturing fixture may be used for performing the manufacturing process on the part, ensuring the part is within specific tolerances. As used herein a manufacturing process is any process that is performed on a part during the manufacturing of the part. A manufacturing process may include fabrication of the part, that is, the shaping or assembly of the part from raw materials, intermediary manufacturing processes, such as welding, surface treatments, heat treatments, and coatings, and inspections, such as weld checks or inspections to verify that part is within specified tolerance at various locations along the part. Each one of the plurality of adjustable part-manufacturing tools has a plurality of locating details that are adjustable to move the position of the locating details within a specified tolerance, prior to performing the manufacturing process on the part. For example, engineering or tooling requirements may require the locating details to be within a 0.005-inch tolerance or a 0.015-inch tolerance. Rather than reworking (e.g., modifying) a part-manufacturing tool with fixed locating details, the position of the locating details can be adjusted to move the locating details within the specified tolerance, eliminating the need for reworking the tool. The ability to adjust the locating details enables the adjustable part-manufacturing tool to be adjusted to the required accuracy, ensuring that a manufacturing fixture is accurate without performing reworking on any part-manufacturing tool.

Figure 1:
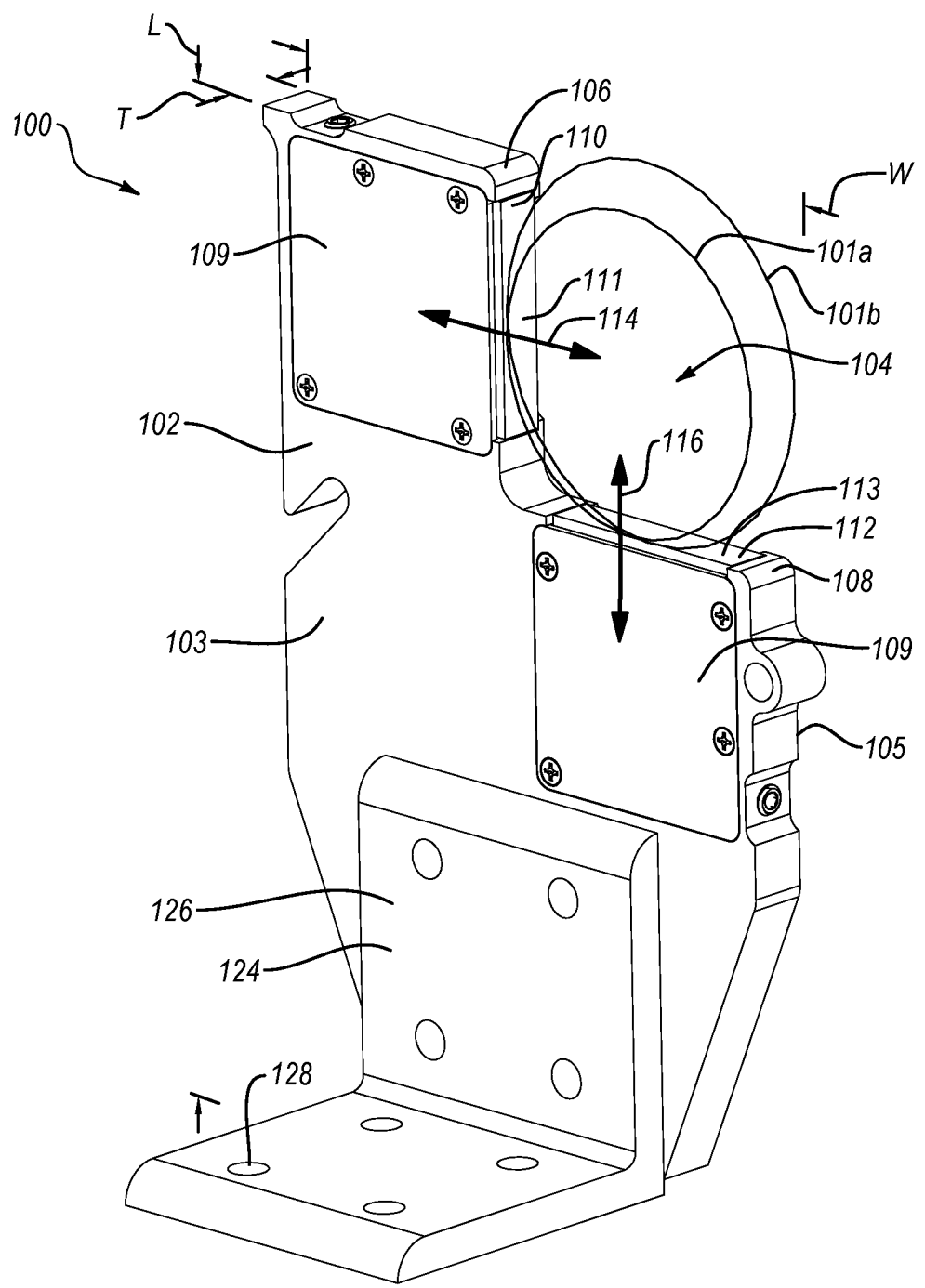
FIG. 1 is a schematic perspective view of an adjustable part-manufacturing tool, according to one or more examples of the present disclosure.

Referring to FIG. 1, according to one example, an adjustable part-manufacturing tool 100 is shown. The adjustable part-manufacturing tool 100 includes a tool body 102. The tool body 102 can have any of various sizes or shapes and is configured to receive a part during a manufacturing process of the part. The tool body 102 has a first surface 103 and a second surface 105 that are spaced apart by a thickness T. In some examples, the first surface 103 and the second surface 105 are parallel surfaces, such that the thickness T is uniform along a length L and a width W of the tool body 102. In other examples, the first surface 103 and the second surface 105 may be non-parallel surfaces, thus enabling the thickness T to vary along the length L or the width W of the tool body 102. The tool body 102 may also include a cover 109 or plurality of covers 109 which are configured to enclose a channel opening, as discussed in more detail with reference to FIG. 3.

A part-receiving receptacle 104 is included in the tool body 102. As used herein, a part-receiving receptacle refers to a specific region or feature on the tool body 102 that is configured to accommodate, hold, or support (i.e., receive) a part during a manufacturing process of the part. The part-receiving receptacle 104 extends an entirety of the thickness T of the tool body 102. A first side 106 and a second side 108 define the part-receiving receptacle 104, where the first side 106 is angled (i.e., non-parallel) relative to the second side 108. In some examples, the first side 106 is angled relative to the second side 108 at a 90-degree angle. That is, the first side 106 and the second side 108 are perpendicular to each other. Accordingly, the part-receiving receptacle 104 is configured to receive parts having a circular or a rectilinear cross-section. For example, a part having a circular cross section (e.g., part 101a or part 101b) is depicted as a circle in FIG. 1. In other examples, the first side 106 and the second side 108 are angled at an oblique angle. Accordingly, the part-receiving receptacle 104 is configured to receive parts having a non-orthogonal cross-section.

A first locating detail 110 is movably coupled to the tool body 102 along the first side 106 of the part-receiving receptacle 104. The first locating detail 110 includes a first locating surface 111 that is configured to contact a part, when the part is received within the part-receiving receptacle 104. Moreover, the first locating surface 111 is a planar surface that is selectively movable within the part-receiving receptacle 104 in first opposing directions 114. That is, the first locating surface 111 is selectively movable toward and away from the first side 106, effectively changing the distance between the first locating surface 111 and the first side 106. In some examples, the first opposing directions 114 are perpendicular to the first side 106. Accordingly, in these examples, the first locating surface 111 and the first side 106 are parallel to each other. In some cases, the first locating surface 111 and the first side 106 may be laterally aligned at an initial alignment and the first locating surface 111 selectively movable, within the part-receiving receptacle 104, from the initial alignment.

Likewise, a second locating detail 112 is movably coupled to the tool body 102 along the second side 108 of the part-receiving receptacle 104. The second locating detail 112 includes a second locating surface 113 that is configured to contact a part, when the part is received within the part-receiving receptacle 104. Moreover, the second locating surface 113 is a planar surface that is selectively movable within the part-receiving receptacle 104 in second opposing directions 116. That is, the second locating surface 113 is selectively movable toward and away from the second side 108, effectively changing the distance between the second locating surface 113 and the second side 108. The second opposing directions 116 are angled relative to the first opposing directions 114. For example, the second opposing directions 116 may be perpendicular relative to the first opposing directions 114. In some examples, the second opposing directions 116 are perpendicular to the second side 108. Accordingly, in these examples, the second locating surface 113 and the second side 108 are parallel to each other. In some cases, the second locating surface 113 and the second side 108 may be laterally aligned at an initial alignment and the second locating surface 113 selectively movable, within the part-receiving receptacle 104, from the initial alignment.

The first locating detail 110 and the second locating detail 112 are selectively movable to allow the first locating surface 111 and the second locating surface 113, respectively, to accommodate locating parts of different sizes on the first locating surface 111 and the second locating surface 113. Accordingly, the adjustable part-manufacturing tool 100 may be used with parts of various sizes. For example, the adjustable part-manufacturing tool 100 may be used with the part 101a and the part 101b. Provided that the part is capable of making contact with all of the locating surfaces within the part-receiving receptacle 104, the adjustable part-manufacturing tool 100 is compatible with the part. However, some parts may require a differently sized adjustable part-manufacturing tool 100 having a larger or a smaller part-receiving receptacle 104. For example, a part having a diameter larger than the part 101b may require an adjustable part-manufacturing tool 100 having a larger part-receiving receptacle 104 in order to contact each one of the locating surfaces. Additionally, a part having a diameter smaller than the part 101a may require an adjustable part-manufacturing tool 100 having a smaller part-receiving receptacle 104 in order to contact each one of the locating surfaces.

Both the first locating detail 110 and the second locating detail 112 are configured to be precisely adjusted to move the first locating surface 111 and the second locating surface 113, respectively, within at least a specified tolerance. Engineering or tooling standards frequently require that the adjustable part-manufacturing tool 100 conform to a specified tolerance, such as a tolerance limit or within a tolerance range, to be employed in the part manufacturing process. Consequently, the adjustable part-manufacturing tool 100 used during a manufacturing process of a part is required to maintain locating surfaces within the specified tolerance. Therefore, the first locating detail 110 may be finely adjustable to ensure that the first locating surface 111 is within the specified tolerance. Likewise, the second locating detail 112 may be finely adjustable to ensure that the second locating surface 113 is within the specified tolerance. In some examples, the first locating detail 110 and the second locating detail 112 may be finely adjustable to any desired position within a given range. For example, the first locating detail 110 and the second locating detail 112 may be adjustable to any desired position within a range of 0.001 and 0.02 inches, or a range of 0.001 and 0.015 inches, etc. In other examples, the first locating detail 110 and the second locating detail 112 may be adjustable to any of various predefined positions. In yet other examples, the first locating detail 110 and the second locating detail 112 are adjustable in increments of at least 0.001 inches. For example, the first locating detail 110 and the second locating detail 112 being adjustable in increments of at least 0.001 inches may be useful in part manufacturing processes where very fine tuning of the locating details is preferable. Similarly, the first locating detail 110 and the second locating detail 112 being adjustable in increments of at least 0.015 inches may be useful in part manufacturing processes having a specified tolerance of 0.015 inches, as is often the requirement in the manufacturing of tubes or ducts. Alternatively, the first locating detail 110 and the second locating detail 112 are adjustable in other increments including but not limited to 0.001 inches, 0.005 inches, 0.01 inches, etc.

The first locating detail 110 and the second locating detail 112 are made of a rigid material. That is, when the first locating detail 110 and the second locating detail 112 are set within the specified tolerance, the first locating detail 110 and the second locating detail 112 remain fixed in place and do not deform, due to the pressure exerted by a part being received within the part-receiving receptacle 104. In some examples, the first locating detail 110 and the second locating detail 112 are made of a metal material. The tool body 102 may be made of a material having a different rigidity than the first locating detail 110 and the second locating detail 112. In some examples, the tool body 102 may be made of a polymer and may be formed by a molding process or 3D printed. In some examples, the first locating detail 110 and the second locating detail 112 are made of a material that is more rigid than the material of the tool body 102.

The adjustable part-manufacturing tool 100 also includes an attachment bracket 124. The attachment bracket 124 is configured to attach the adjustable part-manufacturing tool 100 to a base plate (see, e.g., FIGS. 7 and 8). The attachment bracket 124 may be integrally formed with the tool body 102, such that the tool body 102 and the attachment bracket 124 have a unitary construction. In other examples, the attachment bracket 124 may be permanently or removably attached to the tool body 102 as a separate component. For example, the attachment bracket 124 may be removably attached to the tool body 102, allowing for the attachment bracket 124 to be removed and replaced with another attachment bracket 124. Specifically, a first attachment bracket may be replaced with a second attachment bracket having a different size or shape from the first attachment bracket.

The attachment bracket 124 includes a body-attachment portion 126 and a base-attachment portion 128. The body-attachment portion 126 is attached to the tool body 102, whether integral with the tool body 102 or permanently or removably attached, and the base-attachment portion 128 is configured to be attachable to a base plate (not shown). In some examples, the body-attachment portion 126 is angled relative to the base-attachment portion 128. For example, the body-attachment portion 126 may be angled, relative to the base-attachment portion 128 at a 90-degree angle. That is, when the base-attachment portion 128 is attached to the base plate, the movement of the second locating surface 113 in the second opposing directions 116 is perpendicular to the base plate and the base-attachment portion 128. In other words, the base-attachment portion 128 can be perpendicular to the length L of the tool body 102. In other examples, the body-attachment portion 126 is angled at an oblique angle relative to the base-attachment portion 128. That is, when the base-attachment portion 128 is attached to the base plate, the movement of the second locating surface 113 in the second opposing direction 116 is non-perpendicular to the base plate and the base-attachment portion 128. In other words, the base-attachment portion 128 can be non-perpendicular to the length L of the tool body 102. The angle between the body-attachment portion 126 and the base-attachment portion 128 can be adjustable (such as via a hinge and adjustment mechanism) to accommodate parts having sloped portions.

Figure 2:
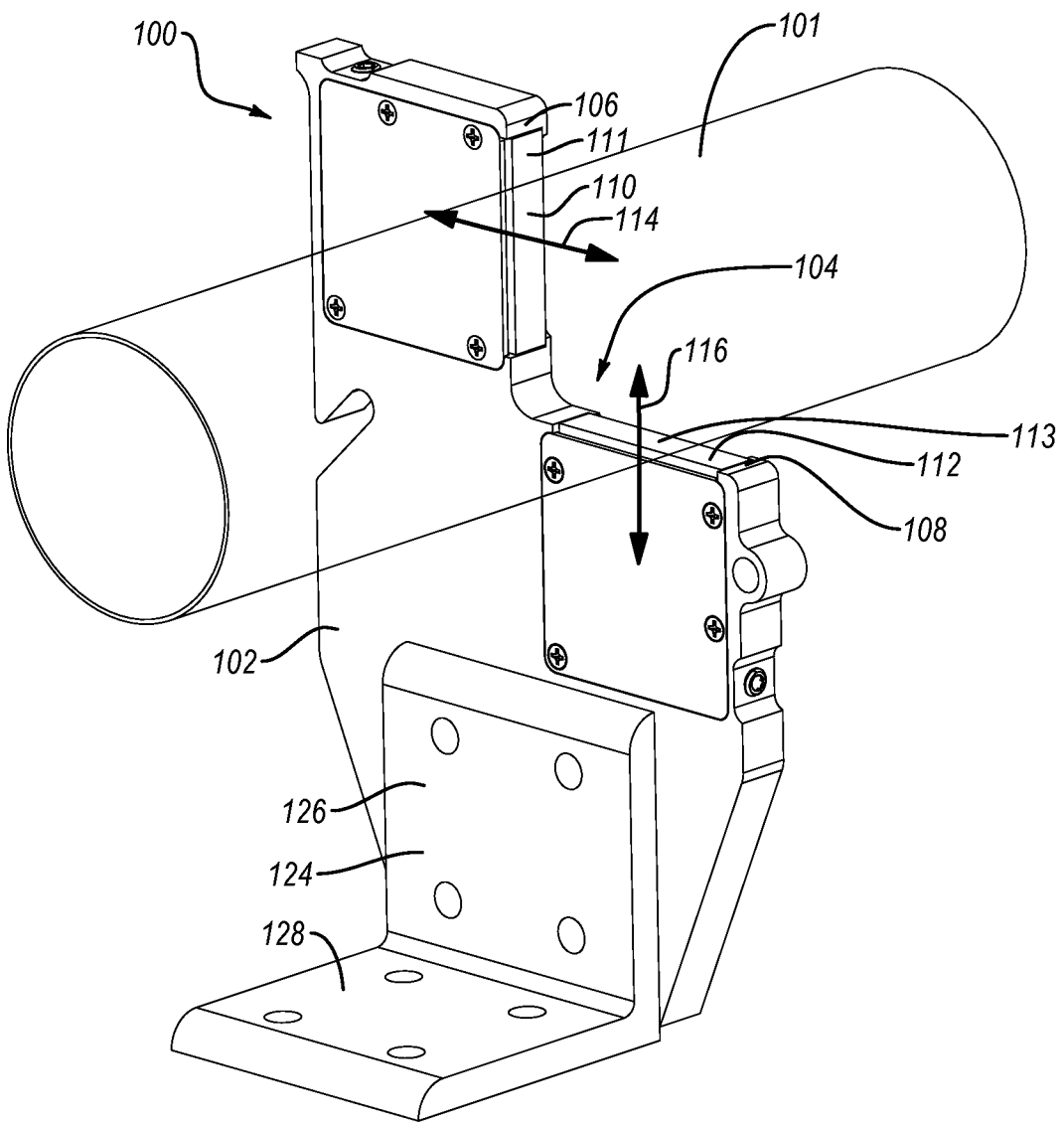
FIG. 2 is a schematic perspective view of the adjustable part-manufacturing tool of FIG. 1, with a part on the adjustable part-manufacturing tool, according to one or more examples of the present disclosure.

As shown in FIG. 2, a part 101 is received within the part-receiving receptacle 104. The part 101 is contacting, or within a specified tolerance, of the first locating surface 111 and the second locating surface 113. The part 101 has a length that is greater than the thickness T of the tool body 102, such that the part 101 extends beyond the first surface 103 and the second surface 105 of the tool body 102. As such, the adjustable part-manufacturing tool 100 can be used, during the manufacturing of the part, to receive a portion of the length of the part 101 within the part-receiving receptacle 104. The use of multiple adjustable part-manufacturing tools 100 allows for the part to be accommodated, held, or supported during any of various manufacturing processes, including but not limited to fabrication of the part 101, intermediary manufacturing processes of the part 101, such as welding, and/or inspection of the part 101.

Figure 3:
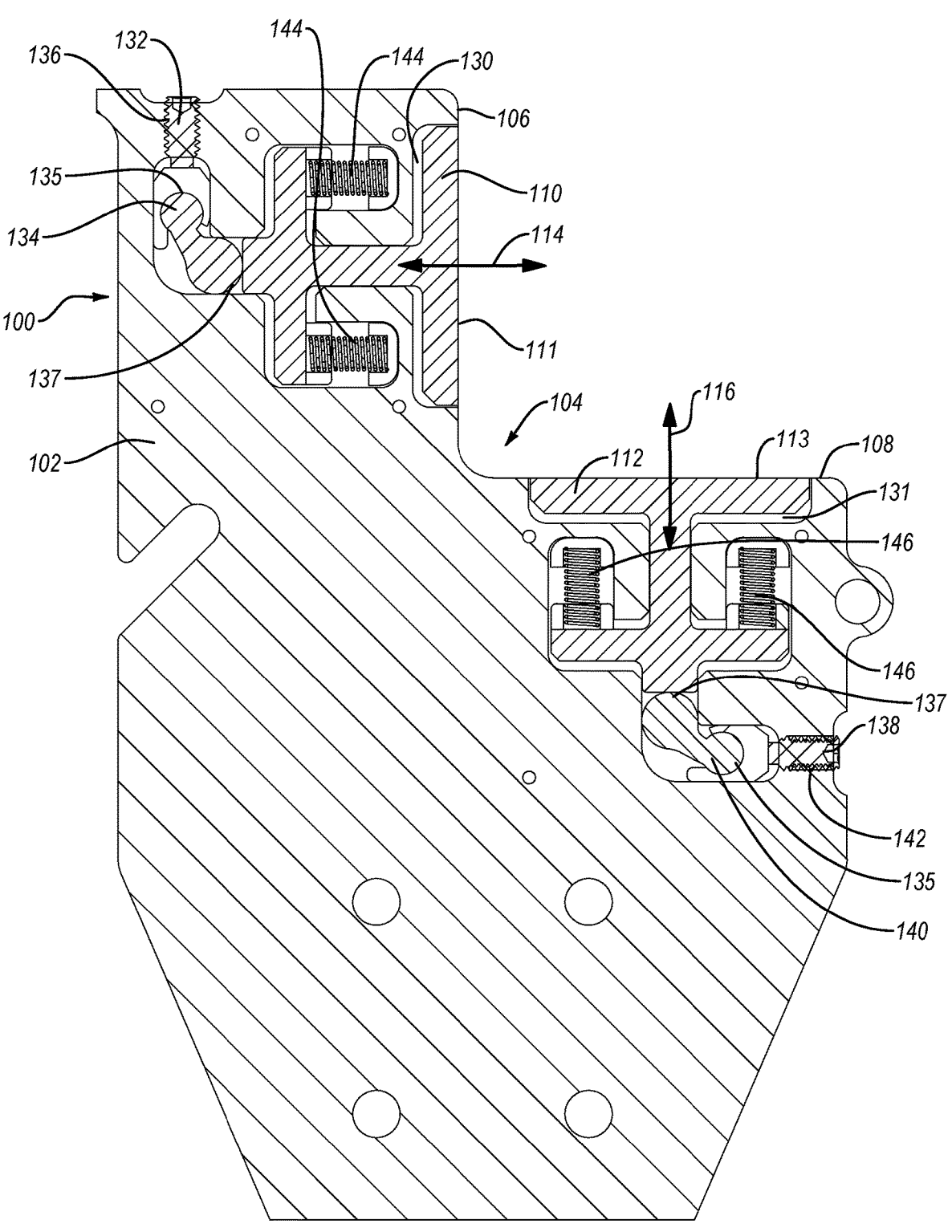
FIG. 3 is a schematic cross-sectional side view an adjustable part-manufacturing tool, according to one or more examples of the present disclosure.

Referring to FIG. 3, a cross-sectional side view of the adjustable part-manufacturing tool 100, taken through the thickness T of the tool body 102, is shown. The tool body 102 includes a first channel 130 that extends into the tool body 102 from the first side 106 of the part-receiving receptacle 104 and a second channel 131 that extends into the tool body 102 from the second side 108 of the part-receiving receptacle 104. The first channel 130 and the second channel 131 can extend through the entire thickness T of the tool body 102, such that the first channel 130 and the second channel 131 extend from the first surface 103 to the second surface 105 of the tool body 102. A cover 109 (see, e.g., FIG. 1) may be employed to enclose the channel openings exposed on the first surface 103 and the second surface 105. Accordingly, a plurality of covers 109 can be used to protect the locating details and other internal components from damage or exterior exposure. Alternatively, the first channel 130 and the second channel 131 may be enclosed by the sides of the tool body 102, such that the first channel 130 and the second channel 131 are embedded within the thickness T of the tool body 102.

The first locating detail 110, being within the first channel 130, enables the first locating surface 111 to be laterally aligned with, or protrude beyond, the first side 106 of the part-receiving receptacle 104. The first locating detail 110 is configured to move (e.g., slide) within the first channel 130 which moves the first locating surface 111 within the part-receiving receptacle 104 in the first opposing directions 114. The first locating detail 110 may move within the first channel 130 by any movement mechanism and is not limited to the configuration shown in FIG. 3 and described below. Other examples of movement mechanism may include gears, screws, springs, etc. that are employed to move the first locating detail 110.

The movement of the first locating detail 110 is initiated by activating a first set screw 132, which is threadably engaged with a first threaded hole 136 of the tool body 102. The first set screw 132, or other threaded fastener, is activated by tightening or loosening the first set screw 132, manually or automatically, by a corresponding tool. A first cam 134, within the first channel 130 of the tool body 102, is pivotably coupled to the first set screw 132 at a first end 135 of the first cam 134. Accordingly, rotation of the first set screw 132 pivots the first cam 134 within the first channel 130. A second end 137 of the first cam 134 is coupled to the first locating detail 110 and maintains constant contact with the first locating detail 110, such that movement of the first cam 134 creates simultaneous movement in the first locating detail 110. In some examples, the first cam 134 and the first locating detail 110 have abutting surfaces, in other examples, the first cam 134 and the first locating detail 110 are physically attached.

At least one biasing element 144 is within the first channel 130 and is configured to keep the first locating detail 110 under compression within the first channel 130. That is, the biasing element 144 ensures that the first locating detail 110 remains in constant contact with the first cam 134. As used here, a biasing element is a mechanical component configured to maintain continuous contact between the locating detail and the cam by exerting compressive force within the channel. For example, the biasing element may be a coil spring. Accordingly, as the first set screw 132 is activated, the first cam 134 and the first locating detail 110 move simultaneously within the first channel 130.

Likewise, the second locating detail 112, being within the second channel 131, enables the second locating surface 113 to be laterally aligned with, or protrude beyond, the second side 108 of the part-receiving receptacle 104. The second locating detail 112 is configured to move (e.g., slide) within the second channel 131 which moves the second locating surface 113 within the part-receiving receptacle 104 in the second opposing directions 116. The second locating detail 112 may move within the second channel 131 by any movement mechanism and is not limited to the configuration described above in reference to the first locating detail 110. For example, movement of the second locating detail 112 may be controlled through the use of a second set screw 138 within a second threaded hole 142 and pivotably coupled to a second cam 140. Additionally, at least one biasing element 146 can be used to maintain the second locating detail 112 under compression.

Figure 4A:
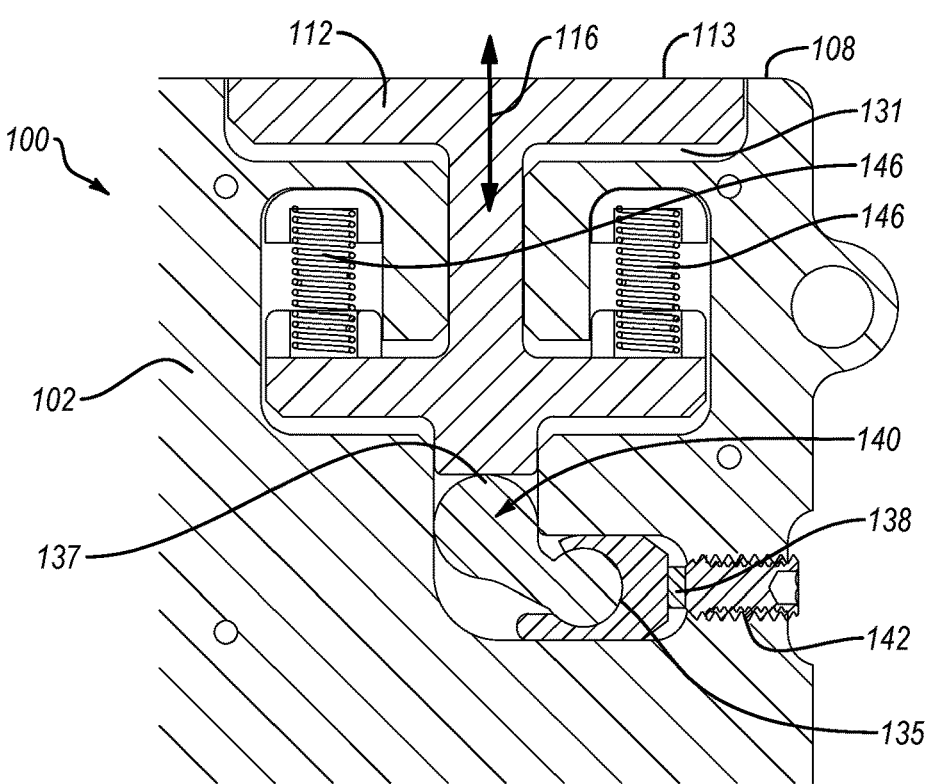
FIG. 4A is a schematic cross-sectional side view of a locating detail within a channel of an adjustable part-manufacturing tool, according to one or more examples of the present disclosure.
Figure 4B:
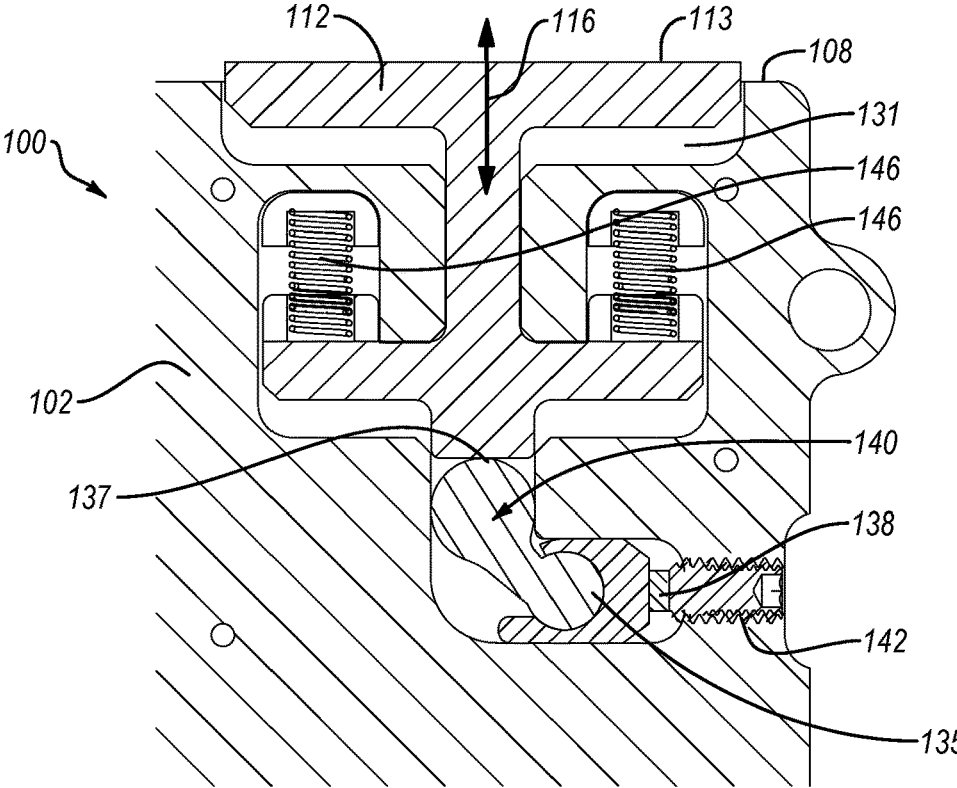
FIG. 4B is a schematic cross-sectional side view of the locating detail of FIG. 4A, shown in a different position, according to one or more examples of the present disclosure.

The movement of the second locating detail 112 is further shown in FIGS. 4A and 4B. As shown in FIG. 4A, the second locating detail 112 is at an initial alignment where the second locating surface 113 is laterally aligned with the second side 108. The second locating detail 112 is fixed in the initial alignment at least partially by two biasing elements 146. To move the second locating surface 113 within a specified tolerance for a part, the position of the second locating surface 113 may be adjusted to a position, such as the position shown in FIG. 4B. That is, the second set screw 138 is activated by tightening the second set screw 138 to pivot the second cam 140 within the second channel 131 and toward the second side 108 of the part-receiving receptacle 104, which further moves the second locating detail 112 in the second opposing direction 116 away from the second side 108. Similarly, the second set screw 138 can be loosened to pivot the second cam 140 within the second channel 131 and away from the second side 108 of the part-receiving receptacle 104, which further moves the second locating detail 112 in the second opposing direction 116 towards the second side 108.

Figure 5:
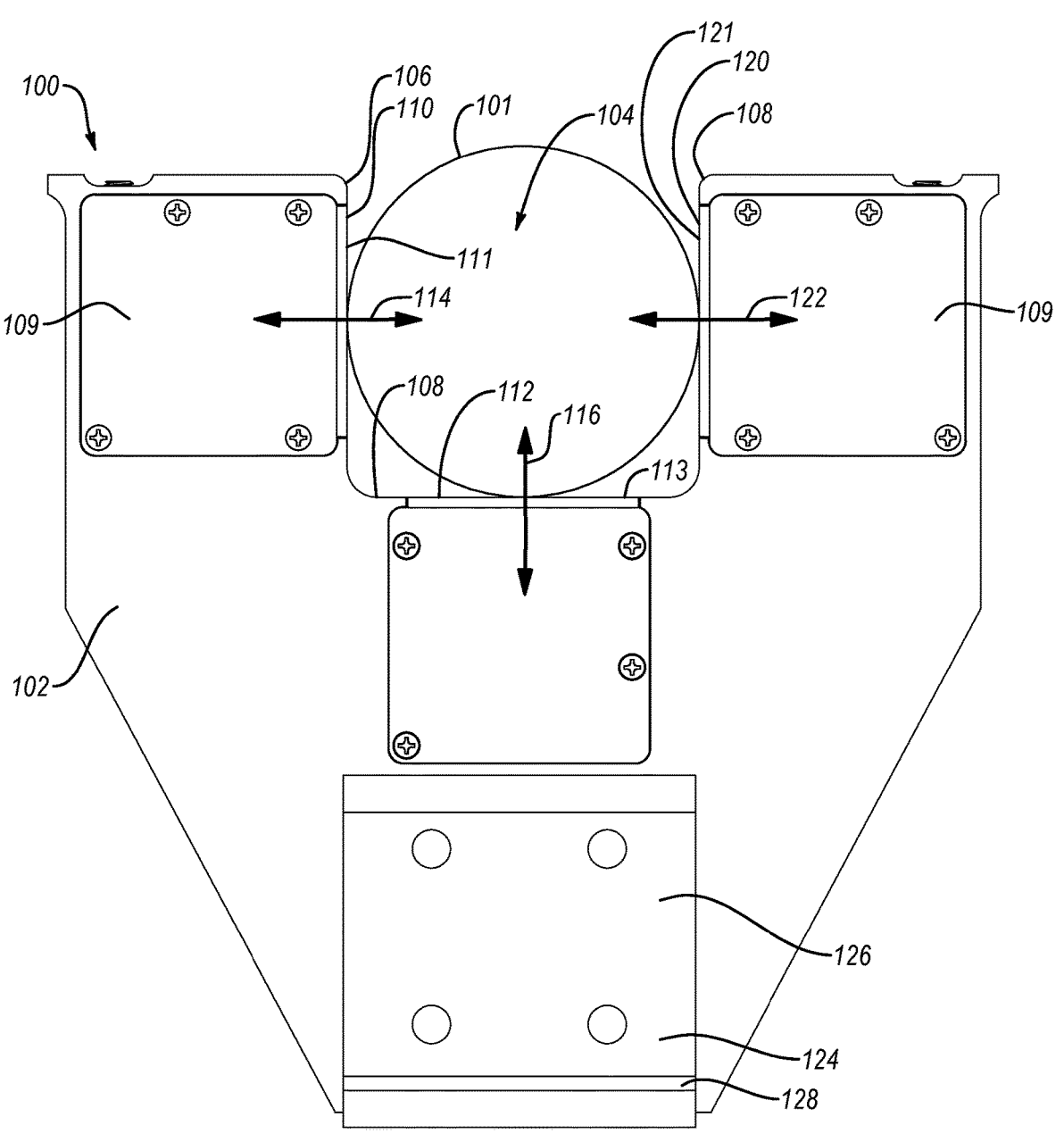
FIG. 5 is a schematic side view of an adjustable part-manufacturing tool, according to one or more examples of the present disclosure.

Referring to FIG. 5, another example of an adjustable part-manufacturing tool 100 is shown. The part-receiving receptacle 104 of the adjustable part-manufacturing tool 100 is defined by the first side 106, the second side 108, and a third side 118. That is, the part-receiving receptacle 104 is defined by three sides and remains open on a fourth side to allow for receiving a part within the part-receiving receptacle 104 through the opening. In other words, the part-receiving receptacle 104 is enclosed by the tool body 102 on three sides. The third side 118 is spaced apart from the first side 106. In some examples, the third side 118 is parallel to the first side 106, however, in other examples, the third side 118 may also be angle outwardly away relative to the first side 106. The second side 108 extends between the first side 106 and the third side 118, such that the first side 106 extends from one end of the second side 108 and the third side 118 extends from another end of the second side 108. In some examples, both the first side 106 and the third side 118 extends from the second side 108 at right angles, such that the part-receiving receptacle 104 is shaped as an open rectilinear shape. Accordingly, the part-receiving receptacle 104 is configured to receive parts having a circular or a rectilinear cross-section.

A third locating detail 120 is movably coupled to the tool body 102 along the third side 118 of the part-receiving receptacle 104. The third locating detail 120 includes a third locating surface 121 that is configured to contact a part, when a part is received within the part-receiving receptacle 104. Moreover, the third locating surface 121 is a planar surface that is selectively movable within the part-receiving receptacle 104 in third opposing directions 122. That is, the third locating surface 121 is selectively movable toward and away from the third side 118, which effectively changes the distance between the third locating surface 121 and the third side 118. In some examples, the third opposing directions 122 are perpendicular to the third side 118. Accordingly, in these examples, the third locating surface 121 and the third side 118 are parallel to each other. Additionally, in some examples, the third opposing directions 122 may be parallel to the first opposing direction 114 and perpendicular to the second opposing directions 116. In some cases, the third locating surface 121 and the third side 118 may be laterally aligned at an initial alignment and the third locating surface 121 is selectively movable, within the part-receiving receptacle 104, from the initial alignment.

All of the locating details, including the third locating detail 120, are selectively movable to allow the locating surfaces, including the third locating surface 121, to accommodate locating parts of different sizes on the locating surfaces. Accordingly, the adjustable part-manufacturing tool 100 can be used with part of various sizes. Moreover, the third locating detail 120 is configured to be precisely adjustable to move the third locating surface 121 within at least a specified tolerance.

Figure 6:
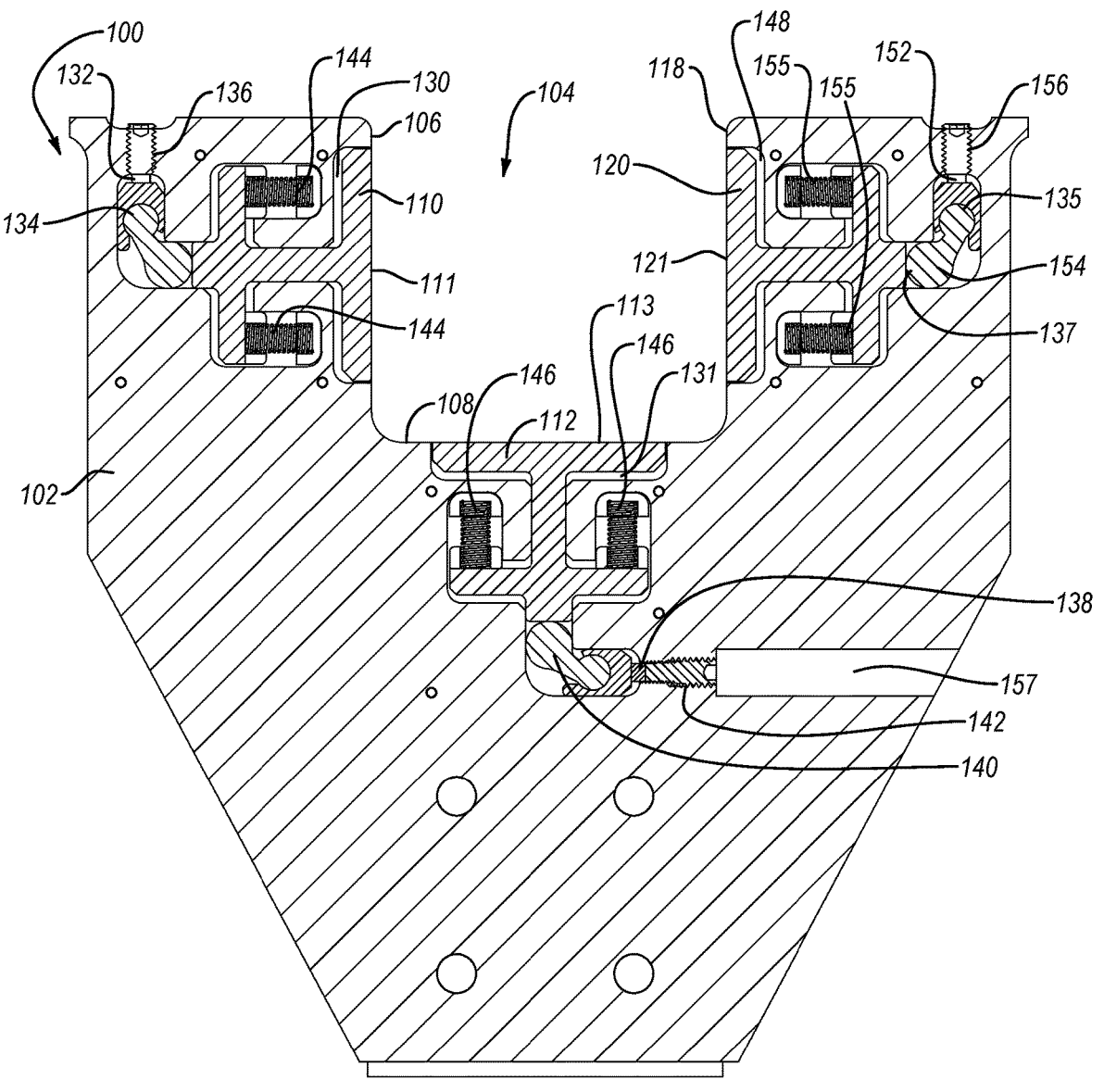
FIG. 6 is a schematic cross-sectional side view of the adjustable part-manufacturing tool of FIG. 5, according to one or more examples of the present disclosure.

Referring to FIG. 6, a cross-sectional side view of the adjustable part-manufacturing tool 100 of FIG. 5, taken through the thickness T of the tool body 102 is shown. Movement of the first locating detail 110 and the second locating detail 112 is described above in reference to FIG. 3. Likewise, the movement of the third locating detail 120 functions in a similar manner and is initiated by activating a third set screw 152, which is threadably engaged with a third threaded hole 156 of the tool body 102. The third set screw 152, or other threaded fastener, is activated by tightening or loosening the third set screw 152, manually or automatically, by a corresponding tool. A third cam 154, within a third channel 148 of the tool body 102, is pivotably coupled to the third set screw 152 at a first end 135 of the third cam 154. Accordingly, rotation of the third set screw 152 pivots the third cam 154 within the third channel 148. A second end 137 of the third cam 154 is coupled to the third locating detail 120 and maintains constant contact with the third locating detail 120 such that movement of the third cam 154 creates simultaneous movement in the third locating detail 120. At least one biasing element 155 may be used to keep the third locating detail 120 under compression. Depending on the size and shape of the tool body 102, the tool body 102 may include a slot 157 that allows access to a set screw, such as the second set screw 138.

Figure 7:
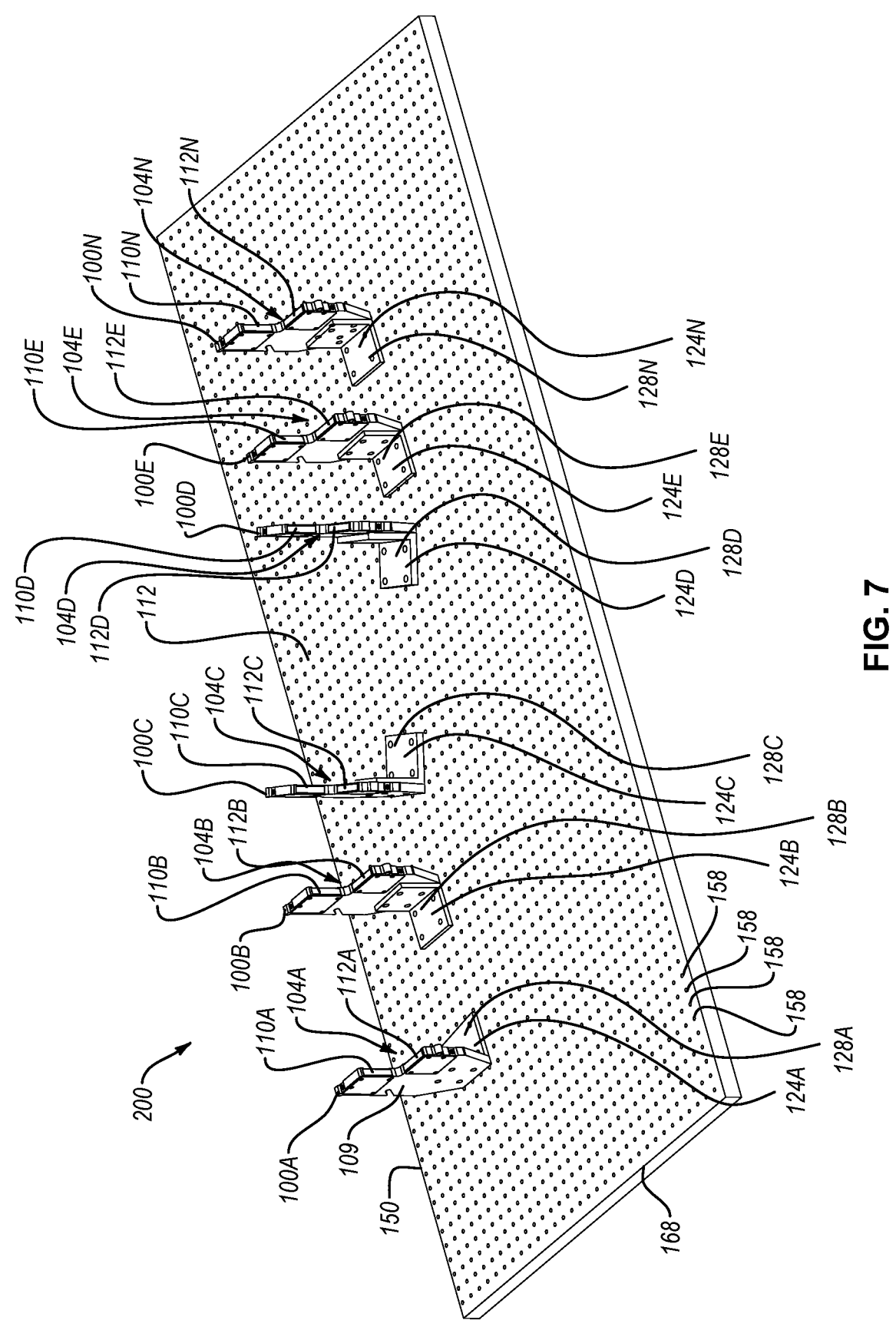
FIG. 7 is a schematic perspective view of a plurality of part-manufacturing tools attached to a base plate, according to one or more examples of the present disclosure.
Figure 8:
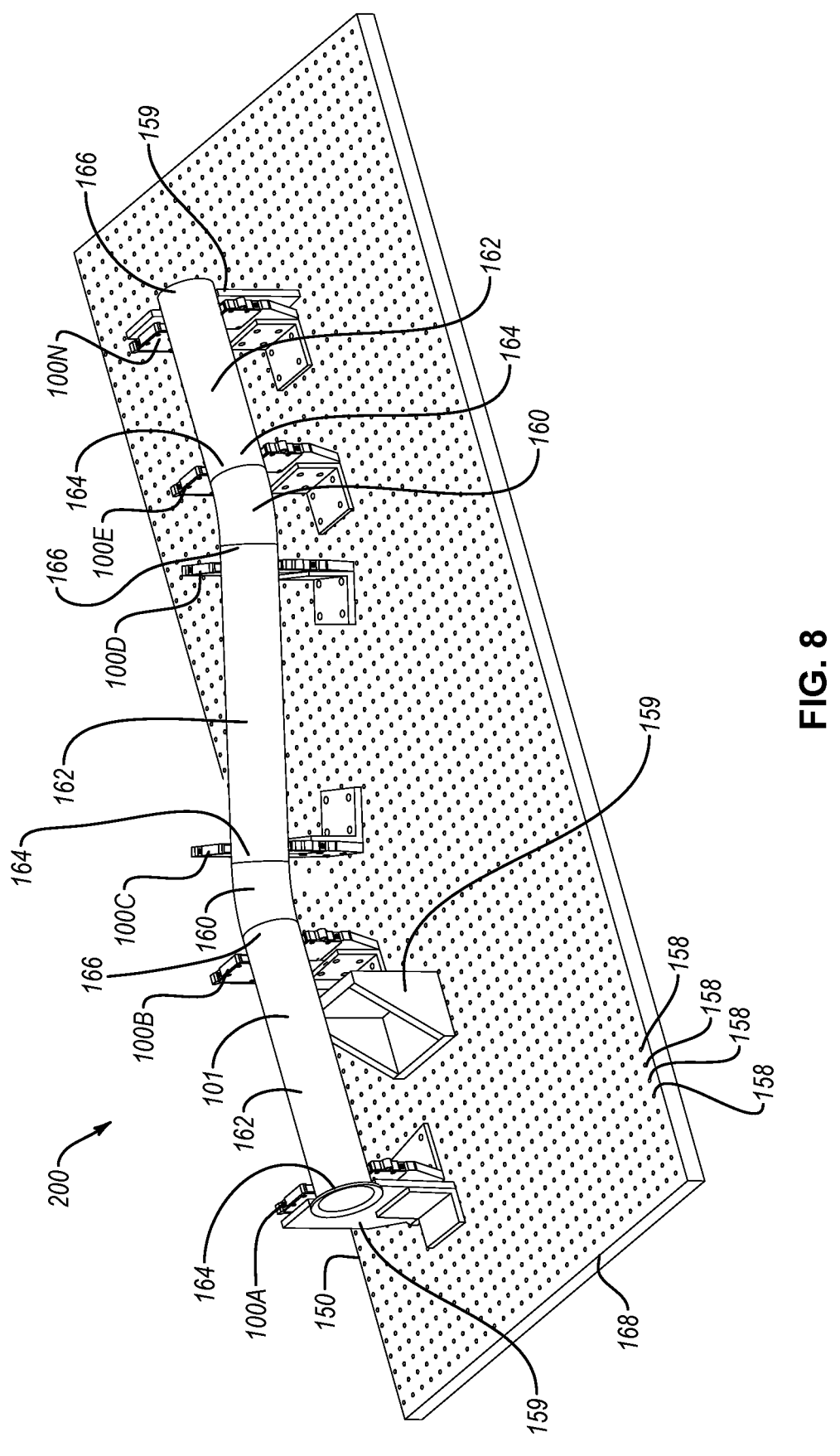
FIG. 8 is a schematic perspective view of a plurality of part-manufacturing tools attached to a base plate, with a part placed within a part-receiving receptacle on each one of the adjustable part-manufacturing tools, according to one or more examples of the present disclosure.

A system 200 for manufacturing of a part 101 is shown in FIGS. 7 and 8. The system 200 may be used during any manufacturing process of the part 101 including, but not limited to, fabrication of the part 101, intermediary manufacturing processes of the part 101, such as welding, and/or inspection of the part 101. The system 200 includes a plurality of adjustable part-manufacturing tools 100 configured to be removably attachable to a base plate 150. As shown, the plurality of adjustable part-manufacturing tools 100A-100N are attached to the base plate 150. Although shown with six adjustable part-manufacturing tools 100A-100N, any number of adjustable part-manufacturing tools 100, up to N number of tools, can be attached to the base plate 150, as needed, for the manufacturing process of the part 101.

Each one of the plurality of adjustable part-manufacturing tools 100A-100N includes a plurality of locating details, such as the first locating details 110A-110N and the second locating detail 112A-112N, respectively. Each one of the plurality of locating details are individually adjustable to adjust each locating detail within a specified tolerance for the part 101.

The plurality of part-manufacturing tools 100A-100N are attached to the base plate 150 by a corresponding attachment bracket 124A-124N. Specifically, the base-attachment portion 128A-128N of the attachment bracket 124A-124N is attached to the base plate 150. As shown, each of the base-attachment portions 128A-128N are perpendicular to the length L of the tool body 102 of the corresponding adjustable part-manufacturing tools 100A-100N. Accordingly, the length L of each one of the adjustable part-manufacturing tools 100A-100N is perpendicular to the base plate 150. However, in other embodiments, some or all of the adjustable part-manufacturing tools 100A-100N may be attached to the base plate 150 such that the length L is at a non-perpendicular angle relative to the base plate 150. Accordingly, some or all of the attachment brackets 124A-124N may have a base-attachment portion 128A-128N that is angled at an oblique angle, relative to the corresponding tool body 102. When the plurality of part-manufacturing tools 100A-100N are attached to the base plate, a resulting manufacturing fixture 168 can be used for a manufacturing process of the part 101.

The base plate 150 has a plurality of fittings 158 that are configured to securely and removably attach the plurality of part-manufacturing tools 100A-100N to the base plate 150. Specifically, the base-attachment portions 128A-18N are removably attachable to any one of the plurality of fittings 158. In some examples, the base-attachment portions 128A-128N can be attached to multiple ones of the plurality of fittings 158. As used herein a fitting is a component or connection point that is designed to connect or join the adjustable part-manufacturing tool 100 to the base plate 150. In some examples, the plurality of fittings 158 may include connectors or couplings. In other examples, the plurality of fittings 158 may include a receptacle, such as a threaded receptacle, designed to receive and secure a threaded fastener that extends from the base-attachment portion 128A-128N to a corresponding fitting 158.

The base plate 150 may be used during a manufacturing process for any of various parts during a manufacturing process. In some examples, different parts can be used with the base plate 150 and the plurality of adjustable part-manufacturing tools 100 without moving or adjusting the adjustable part-manufacturing tools 100. For example, multiple parts having the same size and shape. In other examples, different parts can be used with the base plate 150 and the plurality of part-manufacturing tools 100 by moving or adjusting the adjustable part-manufacturing tools 100. For example, the system 200 may be used for multiple parts having different sizes and/or shape by changing the configuration of the plurality of adjustable part-manufacturing tools 100 to correspond with a current part. That is, the base plate 150 and the plurality of adjustable part-manufacturing tools 100 may be reusable.

As shown in FIG. 8, the part 101 is received within each one of the part-receiving receptacles 104A-104N of the adjustable part-manufacturing tools 100A-100N. The part 101 has at least one straight segment 162 having a first end 164 and a second end 166. One of the adjustable part-manufacturing tools 100 corresponds to the first end 164 and another one of the adjustable part-manufacturing tools 100 corresponds to the second end 166. Accordingly, the two adjustable part-manufacturing tools, for example adjustable part-manufacturing tools 100A-100B, may be used to support the straight segment 162 during a manufacturing process or used to inspect the part 101 for compliance during a manufacturing process. For example, the part 101 has three straight segments separated by two curved or bent segments 160. Two adjustable part-manufacturing tools, such as 100A-100B, 100C-100D, or 100E-100N, are used to receive a straight segment 162 at the first end 164 and the second end 166, respectively. Additional supports 159 may be attached to the base plate 150 and used to help support the part 101 during the manufacturing process. The additional supports 159 are used for support only, and are not used to verify the part during a manufacturing process, such as an inspection process.

Referring to FIG. 9, according to some examples, a method 300 for a manufacturing process of a part 101 is shown. The method 300 includes (block 302) removably attaching at least two adjustable part-manufacturing tools 100 to a base plate 150. Each one of the adjustable part-manufacturing tools 100 includes a plurality of locating details, such as first locating detail 110. For example, each one of the adjustable part-manufacturing tools 100 may have two locating details, and in some examples, may have three locating details. The method 300 also includes (block 304) adjusting the plurality of locating details on each one of the adjustable part-manufacturing tools 100 to position each one of the plurality of locating details within a specified tolerance. Any movement means may be used to adjust the plurality of locating details, such as the mechanism shown in FIG. 3 using a set screw and cam configuration. The plurality of locating details are adjustable within an adjustment range or to set increments, allowing a surface of the locating details to be adjusted to a position within the specified tolerance.

The method 300 further includes (block 306) placing the part 101 within a part-receiving receptacle 104 of each one of the adjustable part-manufacturing tools 100. As the adjustable part-manufacturing tools 100 are intended to help with a manufacturing process, the adjustable part-manufacturing tools 100 are attached on the base plate 150 to align with specific points on the part 101. For example, the adjustable part-manufacturing tools 100 may be intended to align with each end of a straight segment of the part 101. The method 300 also includes (block 308) performing the manufacturing process on the part 101. The manufacturing process may include but is not limited to fabrication of the part 101, an intermediary process of the part 101, such as welding or a welding check, and inspection of the part 101. After the manufacturing process has been performed, the part 101 can be removed, and the adjustable part-manufacturing tools 100 may be detached from the base plate 150. In some examples, the base plate 150 and each one of the adjustable part-manufacturing tools 100 are intended to be reusable with different parts.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the examples herein are to be embraced within their scope.

What is claimed is:

1. An adjustable part-manufacturing tool comprising:

a tool body comprising a part-receiving receptacle defined by a first side and a second side, wherein the first side is angled relative to the second side and the tool body further comprises a first channel, extending into the tool body from the first side, and a second channel, extending into the tool body from the second side;

a first locating detail comprising a first locating surface and movably coupled to the tool body along the first side so that the first locating surface is selectively movable within the part-receiving receptacle in first opposing directions, wherein the first locating detail moves within the first channel when the first locating surface moves within the part-receiving receptacle in the first opposing directions;

a second locating detail comprising a second locating surface and movably coupled to the tool body along the second side so that the second locating surface is selectively movable within the part-receiving receptacle in second opposing directions that are angled relative to the first opposing directions, wherein the second locating detail moves within the second channel when the second locating surface moves within the part-receiving receptacle in the second opposing directions;

a first cam within the first channel and pivotably coupled with the first locating detail so that when the first cam pivots within the first channel the first locating detail moves in one of the first opposing directions within the first channel; and a second cam within the second channel and pivotably coupled with the second locating detail so that when the second cam pivots within the second channel the second locating detail moves in one of the second opposing directions within the second channel;

wherein selective movement of the first locating surface and the second locating surface accommodates locating parts of different sizes on the first locating surface and the second locating surface within a specified tolerance.

2. The adjustable part-manufacturing tool of claim 1, wherein the first side is angled relative to the second side at a 90-degree angle.

3. The adjustable part-manufacturing tool of claim 1, wherein the second opposing directions are perpendicular to the first opposing directions.

4. The adjustable part-manufacturing tool of claim 1, wherein the first locating detail and the second locating detail are made of a material that is more rigid than the material of the tool body.

5. The adjustable part-manufacturing tool of claim 1, wherein the first locating detail and the second locating detail are adjustable in increments of at least 0.001 inches.

6. The adjustable part-manufacturing tool of claim 1, wherein:

the part-receiving receptacle is further defined by a third side;

the third side is spaced apart from and parallel to the first side;

the second side extends between the first side and the third side; and a third locating detail comprises a third locating surface and is movably coupled to the tool body along the third side so that the third locating surface is selectively movable within the part-receiving receptacle in third opposing directions that are parallel to the first opposing directions.

7. The adjustable part-manufacturing tool of claim 1, further comprising an attachment bracket comprising a body-attachment portion and a base-attachment portion, wherein:

the body-attachment portion is attached to the tool body; and the base-attachment portion is configured to be removably attachable to a base plate.

8. The adjustable part-manufacturing tool of claim 7, wherein the body-attachment portion is angled relative to the base-attachment portion.

9. The adjustable part-manufacturing tool of claim 1, wherein:

the first locating detail slides within the first channel when the first locating surface moves within the part-receiving receptacle in the first opposing directions; and the second locating detail slides within the second channel when the second locating surface moves within the part-receiving receptacle in the second opposing directions.

10. The adjustable part-manufacturing tool of claim 9, wherein:

the tool body further comprises a first threaded hole;

the adjustable part-manufacturing tool further comprises a first set screw threadably engaged with the first threaded hole;

the first cam is pivotably coupled to the first set screw so that rotation of the first set screw within the first threaded hole pivots the first cam within the first channel;

the tool body further comprises a second threaded hole;

the adjustable part-manufacturing tool further comprises a second set screw threadably engaged with the second threaded hole; and the second cam is pivotably coupled to the second set screw so that rotation of the second set screw within the second threaded hole pivots the second cam within the second channel.

11. The adjustable part-manufacturing tool of claim 9, wherein the adjustable part-manufacturing tool further comprises:

at least one first biasing element within the first channel configured to keep the first locating detail under compression; and at least one second biasing element within the second channel configured to keep the second locating detail under compression.

12. A system for inspecting a part, the system comprising:

a base plate; and a plurality of adjustable part-manufacturing tools configured to be removably attachable to the base plate, each one of the plurality of adjustable part-manufacturing tools comprising:

a tool body comprising a part-receiving receptacle defined by a first side and a second side, wherein the first side is angled relative to the second side and the tool body further comprises a first channel, extending into the tool body from the first side, and a second channel, extending into the tool body from the second side;

a first locating detail comprising a first locating surface and movably coupled to the tool body along the first side so that the first locating surface is selectively movable within the part-receiving receptacle in first opposing directions, wherein the first locating detail moves within the first channel when the first locating surface moves within the part-receiving receptacle in the first opposing directions;

a second locating detail comprising a second locating surface and movably coupled to the tool body along the second side so that the second locating surface is selectively movable within the part-receiving receptacle in second opposing directions that are angled relative to the first opposing directions, wherein the second locating detail moves within the second channel when the second locating surface moves within the part-receiving receptacle in the second opposing directions;

a first cam within the first channel and pivotably coupled with the first locating detail so that when the first cam pivots within the first channel the first locating detail moves in one of the first opposing directions within the first channel;

a second cam within the second channel and pivotably coupled with the second locating detail so that when the second cam pivots within the second channel the second locating detail moves in one of the second opposing directions within the second channel; and an attachment bracket comprising a body-attachment portion, attached to the tool body, and a base-attachment portion, configured to be removably attachable to the base plate;

wherein selective movement of the first locating surface and the second locating surface accommodates locating parts of different sizes on the first locating surface and the second locating surface within a specified tolerance.

13. The system of claim 12, wherein:

the body-attachment portion of the attachment bracket of at least one of the plurality of adjustable part-manufacturing tools is angled relative to the base-attachment portion at a 90-degree angle; and the at least one of the plurality of adjustable part-manufacturing tools is configured to be attachable to the base plate such that a movement of the second locating surface in second opposing directions is perpendicular to the base plate.

14. The system of claim 12, wherein:

the body-attachment portion of the attachment bracket of at least one of the plurality of adjustable part-manufacturing tools is angled relative to the base-attachment portion at a non-right angle; and the at least one of the plurality of adjustable part-manufacturing tools is configured to be attachable to the base plate such that a movement of the second locating surface in second opposing directions is non-perpendicular to the base plate.

15. The system of claim 12, wherein:

the base plate comprises a plurality of fittings; and the base-attachment portion of the attachment bracket is removably attachable to any one of the plurality of fittings.

16. The system of claim 12, wherein the first locating detail and the second locating detail are made of a material that is more rigid than the material of the tool body.

17. The system of claim 12, wherein:

the first locating detail slides within the first channel when the first locating surface moves within the part-receiving receptacle in the first opposing directions; and the second locating detail slides within the second channel when the second locating surface moves within the part-receiving receptacle in the second opposing directions.

18. The system of claim 12, wherein the body-attachment portion is angled relative to the base-attachment portion.

19. The system of claim 12, wherein:

the part-receiving receptacle is further defined by a third side;

the third side is spaced apart from and parallel to the first side;

the second side extends between the first side and the third side; and a third locating detail comprises a third locating surface and is movably coupled to the tool body along the third side so that the third locating surface is selectively movable within the part-receiving receptacle in third opposing directions that are parallel to the first opposing directions.

20. The system of claim 12, wherein each one of the plurality of adjustable part-manufacturing tools further comprises:

at least one first biasing element within the first channel configured to keep the first locating detail under compression; and at least one second biasing element within the second channel configured to keep the second locating detail under compression.

\*   \*   \*   \*   \*